Figure 1:
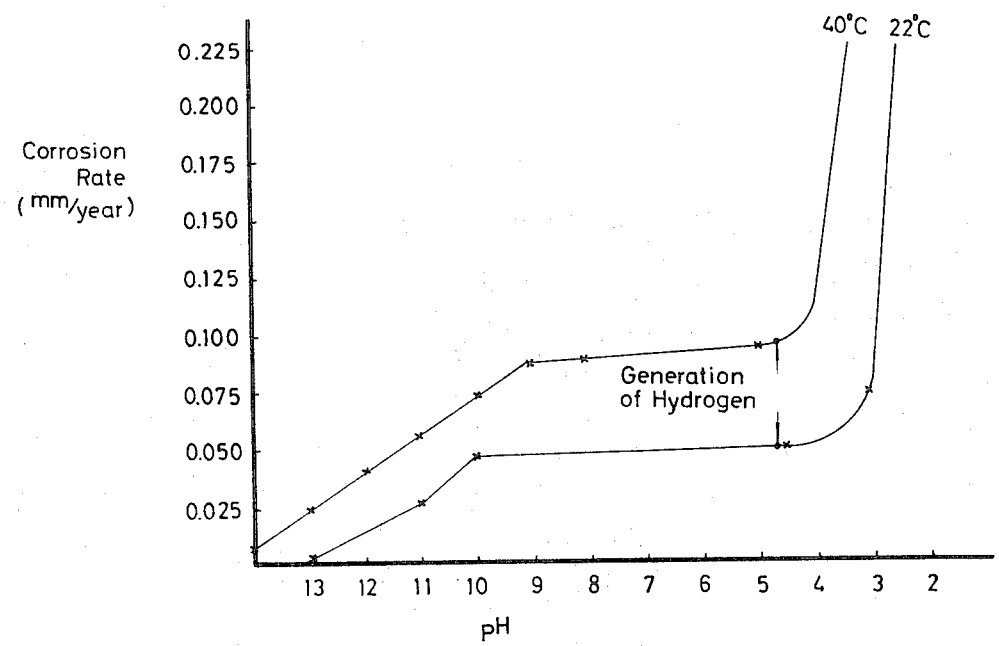

United States Patent [19]
Tabata et al.

[11] 3,766,019
[45] Oct. 16, 1973

[54] MGCO3 ADDITION TO CASO4 CONTAINING SEA WATER TO PREVENT CORROSION

[76] Inventors: Hisanobu Tabata; Norimasa Tabata, both of No. 968, Kou, Ohgoshi-machi; Rokuro Nakajima, No. 1831 Ohyabu-cho, all of Sakaide-shi, Japan

[22] Filed: Dec. 3, 1970

[21] Appl. No.: 94,726

[30] Foreign Application Priority Data
Dec. 15, 1969 Japan................... 44/100773

[52] U.S. Cl................ 203/7, 203/11, 202/173, 252/175
[51] Int. Cl................................. B01d 3/06
[58] Field of Search................ 203/7, 10, 11; 252/80, 88, 175, 180; 23/66, 304, 312, 312 W; 159/DIG. 13; 202/173, 174

[56] References Cited
UNITED STATES PATENTS

| | | | |
|---|---|---|---|
| 3,218,241 | 11/1965 | Checkovich | 203/7 |
| 3,075,828 | 1/1963 | Kato et al. | 26/66 X |
| 2,257,544 | 9/1941 | Clarke | 23/66 |
| 2,276,245 | 3/1942 | Clarke | 23/66 X |
| 2,817,582 | 12/1957 | Chaney | 23/66 X |
| 3,119,752 | 1/1964 | Checkovich | 203/11 |
| 3,414,384 | 12/1968 | Goerg | 23/312 AH |
| 3,501,384 | 3/1970 | Starmer | 203/7 X |
| 3,420,775 | 1/1969 | Cadwallader | 203/7 X |
| 3,401,094 | 9/1968 | Lindsay | 203/7 |
| 3,358,740 | 12/1967 | Akimoto | 203/7 |

FOREIGN PATENTS OR APPLICATIONS
450,605  8/1948  Canada................ 23/312 W Primary Examiner—Norman Yudkoff
Assistant Examiner—David Edwards
Attorney—McGlew & Toren

[57] ABSTRACT

A process for evaporating sea water without causing corrosion of the steel materials of the apparatus comprising reacting calcium sulfate dissolved in the sea water with magnesium carbonate to such an extent that 5 to 10 percent of the original $Ca^{++}$ remains dissolved while the formed calcium carbonate is removed by filtration, adjusting the pH of the treated sea water with a mineral acid to pH 5.0 to 5.5, deaerating it with the rate of deaeration exceeding 90 percent and then introducing the sea water into a stage of a flash evaporation apparatus the temperature of which is lower than 80°C.

4 Claims, 5 Drawing Figures

Effect of pH on Corrosion of Apparatus Steel Materials

MGCO ADDITION TO CASO CONTAINING SEA WATER TO PREVENT CORROSION

The present invention relates to a process for evaporating sea water with almost complete avoidance of corrosion of the steel materials on the flash evaporation apparatus.

At present, sea water is considered the most promising source for making fresh water to meet the shortage of water for various uses. Among methods to make fresh water from sea water, the evaporation method drew particular attention due to the simple apparatus required, easiness of operation and the certainty of production, and for these reasons, attempts have been made to develop the method.

The cost required in making fresh water by evaporating sea water could be reduced by reduction of the cost of the equipment and heat source and by utilizing the by-products. These inevitably should be the principal problems in the developing investigation.

The cost for equipment occupies approximately 40 percent of the total cost of making fresh water and especially the cost of the heat conducting materials amounts to about the half of the cost of equipment.

As has been mentioned above, the evaporation method for making fresh water from sea water is characterized by simple equipment and operation, and therefore the best way to reduce the cost for making fresh water is to reduce the cost of the equipment which is generally recognized. Moreover, reduction of the cost of the heat conducting materials which occupies about 25 percent of the cost of the equipment is the most important.

The present invention is particularly concerned with this point and comprises a process for the flash evaporation of sea water without causing corrosion of the steel material of the apparatus. It is an epoch-making process in which ordinary steel materials, welded or drawn, may be used as the steel materials for the apparatus while avoiding most of the usual precautionary measures against corrosion.

So far, no specifically recommended materials have been found for use as a heat-conducting material for the flash evaporation apparatus in making fresh water by evaporating sea water, and such materials are currently being sought in development research. In fact, however, almost all of the current flash evaporation apparatus employ copper alloys for tube material considering the cost for the material.

Prices of various heat conducting materials, which while not used for evaporating sea water, are used in other various apparatus, are shown for the sake of comparison.

| Material | Ratio of price of tubes |
|---|---|
| Carbon steel (Welded tube) | 0.8 |
| Carbon steel (Seamless) | 1.0 |
| 2¼Cr-½Mo steel | 3.0 |
| Stainless Steel (SUS 27) | 4.4 |
| Stainless steel (SU 28) | 5.0 |
| 25 Cr-20 Ni steel | 9.0 |
| Incoloy alloy 800 | 17.0 |
| Heat resisting cast steel (HU type) | 22.0 |
| Al-Ni | 40.0 |
| Monel metal | 32.5 |
| Heat resisting aluminum | 4.3 |
| Copper | 4.4 |
| Glass lining | 105.0 |
| Epoxy resin | 3.3 |
| Carbon steel with rubber lining | 5.0 |

The present inventors have developed an excellent process for flash evaporating sea water in which not only expensive alloy steels but also steel tubes that have almost never been used due to corrosion could be used as the material for the heat conducting tubes in the flash evaporating apparatus.

More particularly, the present invention is a process for evaporating sea water without causing corrosion of the materials of the apparatus, comprising reacting magnesium carbonate with calcium sulfate dissolved in the sea water to such an extent that Ca ion remains in the amount of 5 to 10 percent of the sea water, filtering off the formed precipitate of calcium carbonate, adjusting the pH of the filtrate to 5.0 to 5.5 with a mineral acid, deaerating it with more than 90 percent deaeration and introducing it into a stage less than 80°C of a flash evaporation apparatus which is at a temperature of less than 80°C.

In other words, the present invention has permitted the flash evaporation of sea water without almost any corroding of the steel materials of the apparatus by avoiding the corroding environment usually present, as well as by forming corrosion resistant films on the surface of steel materials. This is accomplished by using conditions of treatment which are adequately adjusted, such as, the condition of decalcium treatment where calcium sulfate dissolved in sea water was reacted with magnesium carbonate, the condition to adjust the pH, the condition of deaeration and the condition under which the sea water after the treatment was brought into the flash evaporation apparatus.

The following condition should be preferably selected in the present invention when a precipitate of calcium carbonate is formed by reacting magnesium carbonate with calcium sulfate dissolved in sea water.

The reaction should be preferably carried out at a temperature higher than 40°C under stirring. The reaction normally more than 4 hours at 40°C and about 3 hours at 60°C. In this case, the ratio of $CaSO_4$ to $MgCO_3$ in molar ratio should be larger than 1 : 1, and the $MgCO_3$ should be preferably used immediately after preparation and the ratio in weight of $CO_2$ to MgO in the $MgCO_3$ be 1 : 1. When the treatment is carried out under the conditions mentioned, 90 to 95 percent of the $Ca^{++}$ dissolved in sea water is precipitated in the form of $CaCO_3$ and approximately 5 to 10 percent of the ion remains in the sea water, which is presumably in the form of $CaCO_3$ or $CaSO_4$.

In the case where an excess of magnesium carbonate is added, the excessive amount of magnesium carbonate is precipitated and filtered off along with the deposited calcium carbonate.

In this treatment, 90 to 95 percent completion of the reaction is favorable in the operation and is a necessary factor to form a corrosion preventing film. For the reaction to proceed over 95 percent, a longer time is required and even when the temperature is raised over 60°C, this is hardly effective to form a corrosion preventing film.

Sulfuric or hydrochloric acid is used to adjust the pH of the sea water to 5.0 to 5.5 after the decalcium treatment described above. The addition of hydrochloric acid results in a better thermal efficiency and larger elevation of boiling point of the solution after the pH adjustment than the addition of sulfuric acid, but sulfuric acid can attain the same object, though to a slightly lesser extent. Therefore use of sulfuric acid is economically favorable.

Deaeration is conducted in the present invention at the temperature of sea water, i.e., 45° to 55°C with a deaeration rate of 90 to 95 percent. The preferred condition of deaeration is useful in the operation and produces good conditions for the succeeding stages, as described in the following paragraphs.

The rate of deaeration is related to both temperature and degree of vacuum. Thus, a high temperature and a high degree of vacuum are favorable to obtain a high rate of deaeration, but at the high temperature and at the high degree of vacuum, evaporation of the liquid is enchanced and the vapor produced must be suctioned with a vacuum apparatus such as steam ejector. This is unfavorable in that suction of the non-condensing gas is inhibited, the vacuum apparatus occupies a large space and the amount of the steam required for operation becomes large. For high vacuum, in addition, more stages are required for the steam ejector which necessarily results in a large steam requirement for the operation. In considering these factors, the favorable degree of vacuum should be approximately 40 Torr and the rate of deaeration at this degree of vacuum should be about 90 to 95 percent for sea water at 40 to 55°C.

In the treatment above, however, 5 to 10 percent of $CO_2$ remains in the sea water. When the pre-treated sea water is introduced into the flash evaporation apparatus described below wherein the temperature is below 80°C, deaeration as well as evaporation occurs. Deposition of $CaCO_3$ occurs in the meantime which causes elevation of the pH of the sea water and at the same time, a fraction of the deposit presumably forms a corrosion preventing coating film when deposited on the surface of apparatus. The deposited particles of $CaCO_3$ are so tiny that they can hardly be observed with the naked eye. Therefore, they have almost no influence on the thermal conductivity of the materials, as was confirmed.

The deaerated sea water in the manner described above is subsequently introduced into a flash evaporation apparatus under the condition shown below. In this case, sea water at a temperature above 80°C has little influence on the corrosion preventing effect, but a precipitate of magnesium hydroxide is usually formed which is a factor in the scale problem.

In fact, the deaerated sea water is introduced into the flash evaporation apparatus at a temperature below 80°C for reasons of which will be explained as follows.

In the flash evaporation apparatus, the stages which are at temperatures below 80°C are the so-called heat rejection part of the apparatus and therefore the fluid in the heat conducting pipes is a cooled sea water for which the pre-treated sea water described previously is used. Namely, the pre-treated sea water is cooled with a cooling tower and is circulated again. This statement applies around the 18th stage of the flash evaporation apparatus if it contains 20 stages. The temperature of the 3rd stage from the last is below 80°C at which unfavorable precipitation of $Mg(OH)_2$ begins to be formed. The degree of vacuum gradually changes, so that, for example, it is 110 Torr at the 18th, 90 Torr at the 19th, and 50 Torr at the 20th stage. The temperature is lowered in parallel. Therefore evaporation occurs in the 3 stages, where the non-condensing gas remaining unexpelled in the deaerator is almost completely deaerated along with the evaporation of water which occurs to a great extent in these stages. The non-condensing gas dearated in these stages is expelled immediately from the system passing through the cooling part attached to the 18th, 19th and 20th stages. Thus, a factor which can cause corrosion can be effectively avoided.

More particularly, a feature of this process is the immediate removal of freed corrosive gases such as $O_2$ and $CO_2$ which are not deaerated in the deaerator described above. Conditions for the complete dearation are (1) a long time of deaeration, (2) tiny particles of the liquid and (3) a high degree of vacuum. Condition (1) is best satisfied in the upper stages, but the scale trouble caused by the precipitation of $Mg(OH)_2$ is more likely to occur in the upper stages where the temperature is higher.

Condition (2) means a large exposed surface area which, however, does not postulate the 18th stage.

Condition (3) is satisfied mainly at the last stage since the degree of vacuum is the highest at the last stage, but condition (1) is not satisfied there. Another difficulty is that, if the pre-treated sea water which is usually near 50°C is introduced into the last stage which is near 35°C, evaporation becomes more intense in the last stage than in the other stages or the water is taken out of the system without being evaporated. Either case is unfavorable.

The purpose of the evaporation step is not attained by the process mentioned and at the same time evaporation as well as deaeration is not carried actually effected.

Another unfavorable factor is introduction of a high temperature liquid into the last stage which should be cooled. This leads to the neglected difference in the effective temperatures and the lowered thermal efficiency and also to unstable operation.

Figure 2:
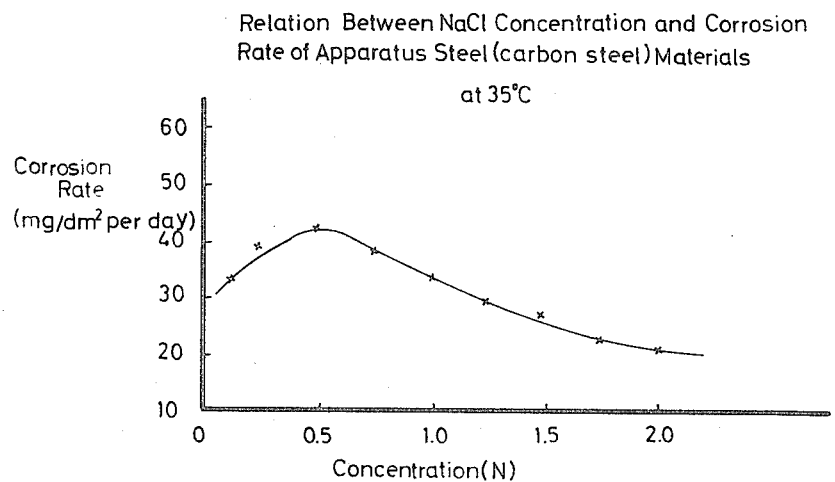
Figure 3:
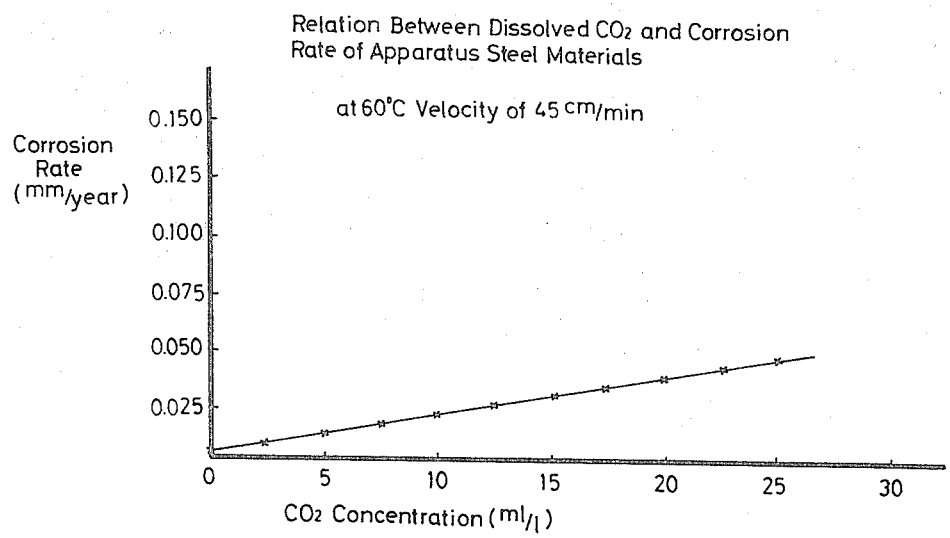

The present invention will be explained in more detail along with various phenomena which take place in the process of this invention referring to the attached drawings in which:

FIGS. 1 to 3 are explanatory of corrosion occurring on steel materials of apparatus in the flash evaporation of sea water in accordance of this invention. More particularly, FIG. 1 is explanatory of the effect of pH on the corrosion of the steel materials, and FIG. 2 shows the relation between the concentration of NaCl and the rate of corrosion which occurs on the steel materials of apparatus, and FIG. 3 shows the relation between the concentration of $CO_2$ and the rate of corrosion which occurs on the steel materials of apparatus.

Figure 4:
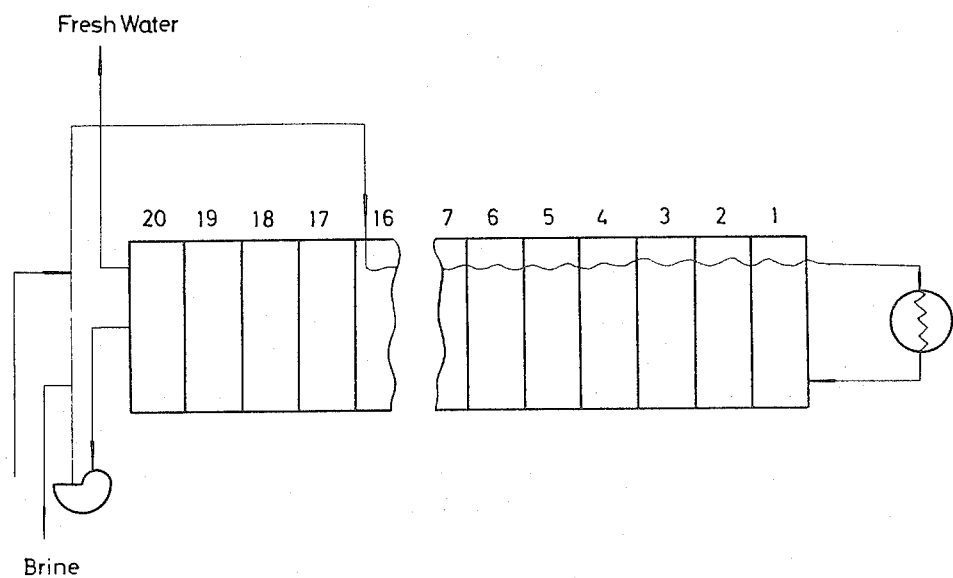

FIG. 4 explains the usually employed process of flash evaporation and

Figure 5:
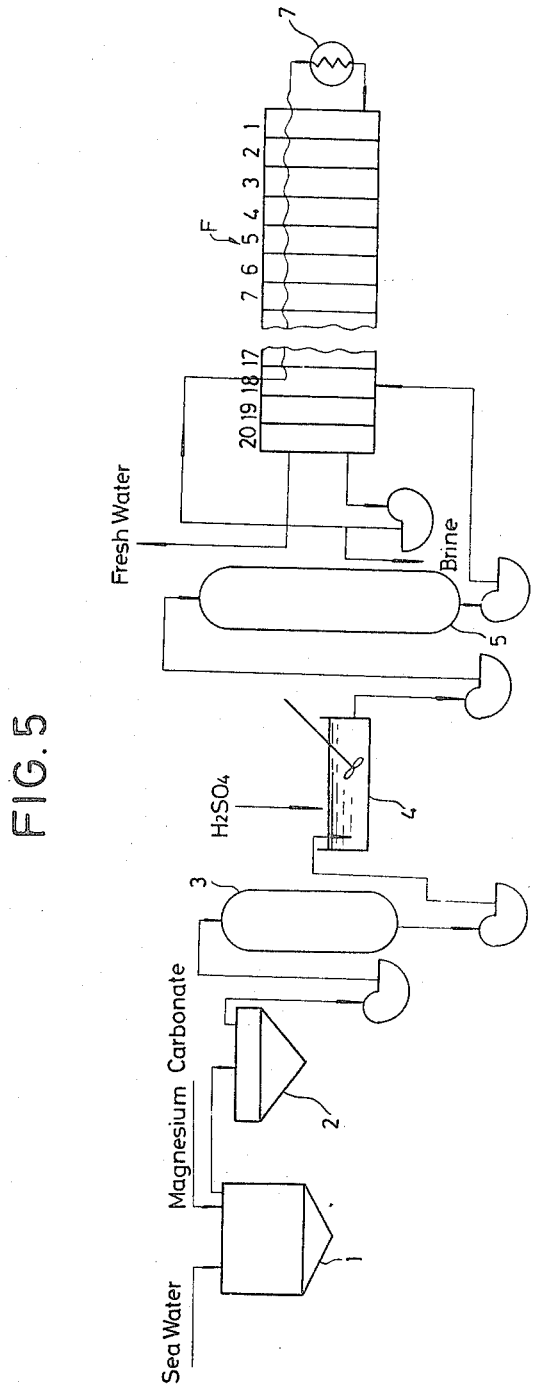

FIG. 5 explains the apparatus which appears in the examples of this invention.

First, corrosion of steel materials of the apparatus to be used in the present invention will be mentioned in relation with pH. In general the surface of steel materials is covered by a coating film of $Fe(OH)_2$ between a pH 5.0 and 9.5 so that the degree of corrosion is independent of pH of the water as shown in FIG. 1. Therefore the rate of corrosion depends in this range of pH on the amount of oxygen dissolved in the water. At a pH above 9.5, the solubility of the coating film of $Fe(OH)_2$ is decreased and at the same time iron is converted into a passive state and, as a result, corrosion ceases to occur almost completely. At a pH below 4.0, Fe(OH)$_2$ is dissolved and the coating film is removed, and therefore hydrogen evolves and the rate of corrosion is increased. The evolution of hydrogen is limited to a pH below 5 where the influence of dissolved oxygen is considerable. The relation between pH and corrosion is varied when the solution contains different salts which attack the coating film of Fe(OH)$_2$.

For example, in a solution containing equivalent amounts of Cl ion and H$_2$CO$_3$, corrosion occurs vigorously even if the solution is neutral or alkaline.

Second, the relation between the amount of dissolved oxygen and the corrosion of steel materials of the apparatus of this invention will be mentioned.

The amount of dissolved oxygen is decreased with the increase in the concentration and the temperature of the sea water. The concentration of oxygen is a factor in determining the rate of corrosion.

The dissolved oxygen acts as depolarizer to accelerate corrosion at concentration up to 10 ppm, while at concentrations above 10 ppm it acts as suppressor by forming protective films on the surface of iron. When the concentration of Cl ion is large, however, the protective films become unstable and therefore the suppressive effect of oxygen disappears. In the sea water which is slightly alkaline (pH 8.0), the rate of corrosion is increased with the increase of dissolved oxygen up to about 16 ppm, but is no longer increased at a larger concentration of oxygen. In neutral sea water (pH 7.0), the amount of corrosion is increased for oxygen concentration up to 16 to 20 ppm, while it is decreased for larger concentrations. In slightly acid sea water (pH 6.0), corrosion is increased with an increase in the amount of dissolved oxygen since protective films of Fe(OH)$_2$ are not formed.

The rate of corrosion is increased with an increase in the salt concentration of the sea water, and the maximum rate is observed at about 0.5 N as seen in FIG. 2. The rate is decreased at the larger concentration because of the smaller solubility of oxygen in the water. On the other hand, carbon dioxide is dissolved in sea water in the form of free CO$_2$, HCO$_3$$^-$ and CO$_3$$^{--}$, among which free CO$_2$ is the most corrosive. However, as seen in FIG. 3, the corrosion due to CO$_2$ is slight relative to the corrosion due to dissolved oxygen.

When calcium bicarbonate exists in the sea water, corrosion preventing film is formed to prevent corrosion. Carbon dioxide dissolved in sea water exists in the form of free carbon dioxide when the pH is below 8, while in the form of carbonate when the pH is above 8.

In conclusion, the main factors which are the most important in the present invention with respect to corrosion are percentage of removed calcium, pH, the dissolved oxygen, the free carbon dioxide and the condition under which the sea water is introduced into the flash evaporation apparatus.

The present invention has succeeded in removing the factors to favoring corrosion so that satisfactory prevention against corrosion can be attained. As a result, the present invention has permitted the use of welded and drawn steel materials as well as relatively expensive materials as heat conductive materials and construction materials for a variety of apparatus without any fear of corrosion.

In this invention, 90 to 95 percent of calcium sulfate dissolved in the original sea water is reacted with magnesium carbonate, precipitated and filtered off as calcium carbonate, and then the treated sea water is adjusted to a pH 5.0 to 5.5 with sulfuric or hydrochloric acid. A large part of calcium carbonate is removed throughout the process, but approximately 2 to 5 percent of Ca$^{++}$ ion remains in the water. The Ca$^{++}$ present in the solution is considered to be in the form of Ca(HCO$_3$)$_2$.

Subsequently the clear sea water from which calcium has been removed and of which the pH has been adjusted is introduced into the deaeration tower to deaerate up to about 90 to 95 percent. The pH is raised during the deaeration process to 6.0 to 6.5.

The treated sea water is then introduced into the low temperature part below, i.e., 80°C of the flash evaporation apparatus. This would be the stage higher than the 18th, for example, in a flash evaporation apparatus containing 20 stages. By being introduced into a stage below 80°C, the pH of the liquid in the flash is lowered to 7.0 to 7.5.

It is important in this process that the treated sea water is introduced into the evaporation part of the flash evaporation apparatus which is at a temperature below 80°C, when the pH of the liquid in the flash becomes 7.0 to 7.5. The reaction taking place is represented by the following formula,

$$Ca(HCO_3)_2 \rightarrow CaCO_3 + H_2O + CO_2$$

and the CO$_2$ gas produced here immediately escapes out of the flash evaporation apparatus system due to the low temperature so that corrosion of the apparatus, if any, is negligible.

If the treated sea water is introduced, for example, into the heat conduction part of the 16th stage of the heat recovery part as is the case with the usual process shown in FIG. 4, the above reaction takes place with the evolution of heat in the closed heat conduction pipe and the water is transferred to the heat exchanger, where the following reactions occur:

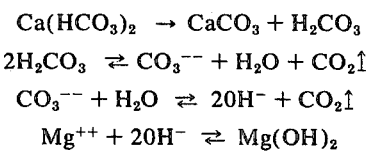

$$Ca(HCO_3)_2 \rightarrow CaCO_3 + H_2CO_3$$
$$2H_2CO_3 \rightleftarrows CO_3^{--} + H_2O + CO_2\uparrow$$
$$CO_3^{--} + H_2O \rightleftarrows 2OH^- + CO_2\uparrow$$
$$Mg^{++} + 2OH^- \rightleftarrows Mg(OH)_2$$

The CO$_2$ gas can not escape from the closed heat conduction pipe where it was produced. This is a main contributor to corrosion. Since the partial pressure of CO$_2$ is high, Ca(HCO$_3$)$_2$ is transferred to the higher temperature part without being decomposed. As a result the pH of the solution in the heat conduction pipe remains at 6.0 to 6.5, the same pH as it was when the solution was lead to this part. Therefore the atmosphere automatically holds the pH of the solution containing the CO$_2$ to 6.0 to 6.5. This means accelerated corrosion of iron and steel as is evident from the above description. The soft scale consisting of Mg(OH)$_2$ which was formed at the same time is apt to cause the scale trouble when it adheres to the heat conduction pipe.

On the contrary, however, when the treated sea water is introduced at first into the low temperature part where the temperature is below 80°C as is the case with the process of this invention, carbonate of Ca which remained in a small amount in the preceding stage of process is decomposed into CaCO$_3$ by evaporation, deaeration and the temperature rise. It is supposed that a fraction thereof is consumed due to the rise of pH of the solution from (6.0 to 6.5) to (7.0 to 7.5) and the remainder forms a thin coating film to protect the steel materials against corrosion.

The coating film is so thin that it can hardly noticed with the naked eye even after a long period of operation and almost no effect is observed on the thermal conductivity. Again, this film grows during a long period of operation by an unknown reason.

The present invention will be explained in detail by referring to examples.

The example which follows is for illustrating the present invention which was carried out using the apparatus shown in FIG. 5. The flash evaporation apparatus consisted of 20 stages, each being 16m long, 2m wide and 2m high, and the heat conduction area being 10m² for each stage and 200m² in total. The heat conduction tubes were made of jointless steel pipes 27mm in diameter and 1.5mm thick and the body of the tank was made of 6mm thick steel plate for construction, JIS SS 41.

As the brine heater, a multipipe system was used which consisted of jointless steel pipes of 50mm inner diameter, 2mm thickness and 32m² area for heat conduction. The following is an example in which sea water was converted into plain water with the flash evaporation apparatus.

The original sea water was continuously introduced into the reaction vessel (1) in the rate of 4 kl/hr. A slurry of magnesium carbonate was added in a continuous stream to react with calcium sulfate dissolved in the original sea water and the mixture was stirred to accelerate the reaction. The formed $CaCO_3$ was lead to the thickner (2) to precipitate the major fraction of it and the solution overflowing the thickner was filtered with the sand filter (3) to obtain clear sea water. The pH of the clear sea water was 8.5. The removed calcium sulfate amounted to 95 percent of the originally dissolved calcium sulfate. The clear sea water was then transferred to the pH adjusting tank (4) and sulfuric acid was added to make the pH 5.5. The resulting solution was introduced into the deaeration tower (5) to deaerate in vacuum with a rate of deaeration of 95 percent. The degree of vacuum was 60 Torr and the temperature was 40°C in the deaeration tower, and the sea water after the deaeration treatment, of which pH was 6.5, contained 0.33 ppm of dissolved oxygen (6.5 ppm for the original sea water). This was introduced into the stage No. 18 (the temperature was 60°C) of the flash evaporation apparatus (F) and the flash evaporation was continued. The obtained 15°B. brine amounted to 0.82 kl/hr and the plain water to 3.18 kl/hr. The Fe content of the brine remained always below 0.1 ppm by analysis and that of the plain water was below 0.05 ppm. In the meantime the Cl content of the plain water was less than 20 ppm. The corrosion of the steel material was entirely negligible as described above. The concentration of the original sea water was 3.5°B. The temperature at the outlet of the brine heater (7) was 120°C and the brine obtained at the stage No. 20 was 38°C.

The whole apparatus was checked after continuous operation for 380 days (8160 hours), but no trace of corrosion was observed on the tank body and the brine heater as well as on the heat conducting pipes. They were almost as perfect as they were at the time of construction. In other words, no troubles due to either corrosion or scales occurred.

Examples carried out with the mentioned apparatus are shown in Table 1 along with examples for comparison.

TABLE 1 pH adjusted to 5.0

| Removed calcium (%) | Rate of deaeration (%) | pH after deaeration | pH in the tank | Fe content of the brine 15°B. (ppm) | Extent of scaling |
|---|---|---|---|---|---|
| 80 | 80 | 5.60 | 6.50 | 2.00 | considerable |
| 80 | 85 | 5.65 | 6.55 | 1.80 | considerable |
| 80 | 90 | 5.70 | 6.70 | 1.70 | considerable |
| 80 | 95 | 5.70 | 6.70 | 1.60 | considerable |
| 85 | 80 | 5.70 | 6.70 | 2.00 | medium |
| 85 | 85 | 5.70 | 6.70 | 1.80 | medium |
| 85 | 90 | 5.75 | 6.75 | 1.70 | medium |
| 85 | 95 | 5.75 | 6.75 | 1.50 | medium |
| 90 | 80 | 5.85 | 6.85 | 1.80 | not observed |
| 90 | 85 | 5.90 | 6.90 | 1.70 | not observed |
| 90 | 90 | 5.90 | 6.90 | 1.50 | not observed |
| 90 | 95 | 6.00 | 7.00 | 0.50 | not observed |
| 95 | 80 | 5.90 | 6.90 | 1.00 | not observed |
| 95 | 85 | 5.90 | 6.90 | 1.00 | not observed |
| 95 | 90 | 5.95 | 6.95 | 0.70 | not observed |
| 95 | 95 | 6.00 | 7.00 | 0.50 | not observed | pH adjusted to 5.5

| Removed calcium (%) | Rate of deaeration (%) | pH after deaeration | pH in the tank | Fe content of the brine 15°B. (ppm) | Extent of scaling |
|---|---|---|---|---|---|
| 80 | 80 | 6.10 | 7.00 | 1.50 | considerable |
| 80 | 85 | 6.15 | 7.05 | 1.30 | do. |
| 80 | 90 | 6.20 | 7.20 | 1.20 | do. |
| 80 | 95 | 6.20 | 7.20 | 0.50 | do. |
| 85 | 80 | 6.20 | 7.20 | 1.00 | medium |
| 85 | 85 | 6.20 | 7.20 | 0.75 | do. |
| 85 | 90 | 6.25 | 7.25 | 0.70 | do. |
| 85 | 95 | 6.25 | 7.25 | 0.50 | do. |
| 90 | 80 | 6.35 | 7.35 | 0.90 | not observed |
| 90 | 85 | 6.40 | 7.40 | 0.80 | do. |
| 90 | 90 | 6.40 | 7.40 | 0.60 | do. |
| 90 | 95 | 6.50 | 7.50 | 0.30 | do. |
| 95 | 80 | 6.40 | 7.40 | 0.50 | not observed |
| 95 | 85 | 6.40 | 7.40 | 0.40 | do. |
| 95 | 90 | 6.45 | 7.45 | 0.30 | do. |
| 95 | 95 | 6.50 | 7.50 | 0.10 | do. |

In the next place examples for comparison are shown in which the pH was adjusted after the removal of calcium outside the range specified in the present invention using the same apparatus.

TABLE 2 pH adjusted to 4.5

| Removed calcium (%) | pH after deaeration | pH in the tank | Fe content of the formed 15°B. brine (ppm) |
|---|---|---|---|
| 80 | 5.5 | 6.5 | 3.00 |
| 85 | 5.5 | 6.5 | 3.00 |
| 90 | 5.5 | 6.5 | 3.00 |
| 95 | 5.5 | 6.5 | 3.00 | pH adjusted to 6.0

| Removed calcium (%) | pH after deaeration | pH in the tank | Fe content of the formed 15°B. brine (ppm) |
|---|---|---|---|
| 80 | 7.0 | 8.0 | 2.00 |
| 85 | 7.0 | 8.0 | 2.00 |
| 90 | 7.0 | 8.0 | 1.00 |
| 95 | 7.0 | 8.0 | 1.00 |

Subsequently examples are shown for the sake of comparison in which the sea water was introduced after the deaeration process into the flash evaporation apparatus under a different condition from that specified in the present invention.

Sea water after the deaeration treatment was introduced in the manner as described above into stage No. 16 in FIG. 4, of which the temperature was 88°C. In this case sea water having a low pH was introduced directly into the heat conducting pipes and was kept in a closed state until the temperature was elevated up to about 120°C. Thus, deaeration by means of evaporation did not take place and the pH was lower by about 0.5°C than that of the liquid in the tank.

Since the introduced sea water was evaporated at a high temperature, unfavorable precipitation of $Mg(OH)_2$ was encountered which caused a scale problem. In this case a coating film of $CaCO_3$ for preventing corrosion was considered not to have been formed, and the $CO_2$ gas which was produced simultaneously passed all the way throughout the entire apparatus, so that resulted in the corrosion of the materials. As a result, the iron content of the formed brine was actually increased. Results of this example are shown in Table 3 for comparison.

TABLE 3 pH adjusted to 5.0

| Removed calcium (%) | pH after deaeration | pH in the tank | Fe content of the formed 15°B. brine (ppm) |
|---|---|---|---|
| 80 | 6.0 | 7.0 | 3.50 |
| 85 | 6.0 | 7.0 | 3.50 |
| 90 | 6.0 | 7.0 | 3.50 |
| 95 | 6.0 | 7.0 | 3.00 | pH adjusted to 5.5

| Removed calcium (%) | pH after deaeration | pH in the tank | Fe content of the formed 15°B. brine (ppm) |
|---|---|---|---|
| 80 | 6.5 | 7.5 | 2.00 |
| 85 | 6.5 | 7.5 | 2.00 |
| 90 | 6.5 | 7.5 | 1.50 |
| 95 | 6.5 | 7.5 | 1.30 | pH adjusted to 4.5

| Removed calcium (%) | pH after deaeration | pH in the tank | Fe content of the formed 15°B. brine (ppm) |
|---|---|---|---|
| 80 | 5.5 | 6.5 | 4.00 |
| 85 | 5.5 | 6.5 | 4.00 |
| 90 | 5.5 | 6.5 | 4.00 |
| 95 | 5.5 | 6.5 | 4.00 | pH adjusted to 6.0

| Removed calcium (%) | pH after deaeration | pH in the tank | Fe content of the formed 15°B. brine (ppm) |
|---|---|---|---|
| 80 | 7.0 | 8.0 | 1.50 |
| 85 | 7.0 | 8.0 | 1.50 |
| 90 | 7.0 | 8.0 | 1.00 |
| 95 | 7.0 | 8.0 | 1.00 |

Turbidity appeared in the tank and scale of $Mg(OH)_2$ adhered on the glass window in the tank.

As has been mentioned above, the process of this invention permits the use of welded and drawn steel materials almost without any precaution being taken against corrosion which would normally have been considered inevitable and provides extremely excellent result in practice by evaporating specifically treated sea water with a flash evaporator under a specified condition.

Of course, various relatively expensive alloy steels which have been employed as corrosion resistant steel materials can be used without limitation. Moreover, they can be used with more benefit for a far longer period than generally recognized.

In addition, the process of this invention may be applied to effectively prevent corrosion not only to the flash evaporation apparatus itself but also to a variety of materials attached to the flash evaporation apparatus which are involved after the deaeration apparatus, and ordinary welded pipes such as a gas pipe may be employed as piping material without any precautions being taken against corrosion

What is claimed is:

1. A process for evaporating sea water without causing corrosion of the steel materials of the apparatus comprising independently of an evaporator, adding magnesium carbonate to the sea water in an amount to react calcium sulfate dissolved in the sea water with magnesium carbonate to such an extent that 5 to 10 percent of the original $Ca^{++}$ remains dissolved in solution while forming a calcium carbonate precipitate, removing said precipitate by filtration, adjusting the pH of the treated sea water with a mineral acid to pH 5.0 to 5.5, deaerating said treated sea water at a rate of deaeration exceeding 90 percent and then introducing the sea water into a stage of a flash evaporation apparatus wherein the temperature is lower than 80°C.

2. A process according to claim 1 in which the reaction of calcium sulfate dissolved in the sea water with magnesium is carried out at a temperature above 40°C and wherein the molar ratio of $CaSO_4$ to $MgCO_3$ is larger than 1 : 1.

3. A process according to claim 1 in which the mineral acid is selected from the group consisting of hydrochloric acid and sulfuric acid.

4. A process according to claim 1 in which the deaeration is carried out at a rate between 90 to 95 percent at a temperature between 45° to 55°C.

* * * * *